W. STUHLDREIER.
FRICTION COUPLING OPERATED BY A CENTRIFUGAL DEVICE.
APPLICATION FILED APR. 14, 1910.
979,595.
Patented Dec. 27, 1910.
2 SHEETS—SHEET 1.
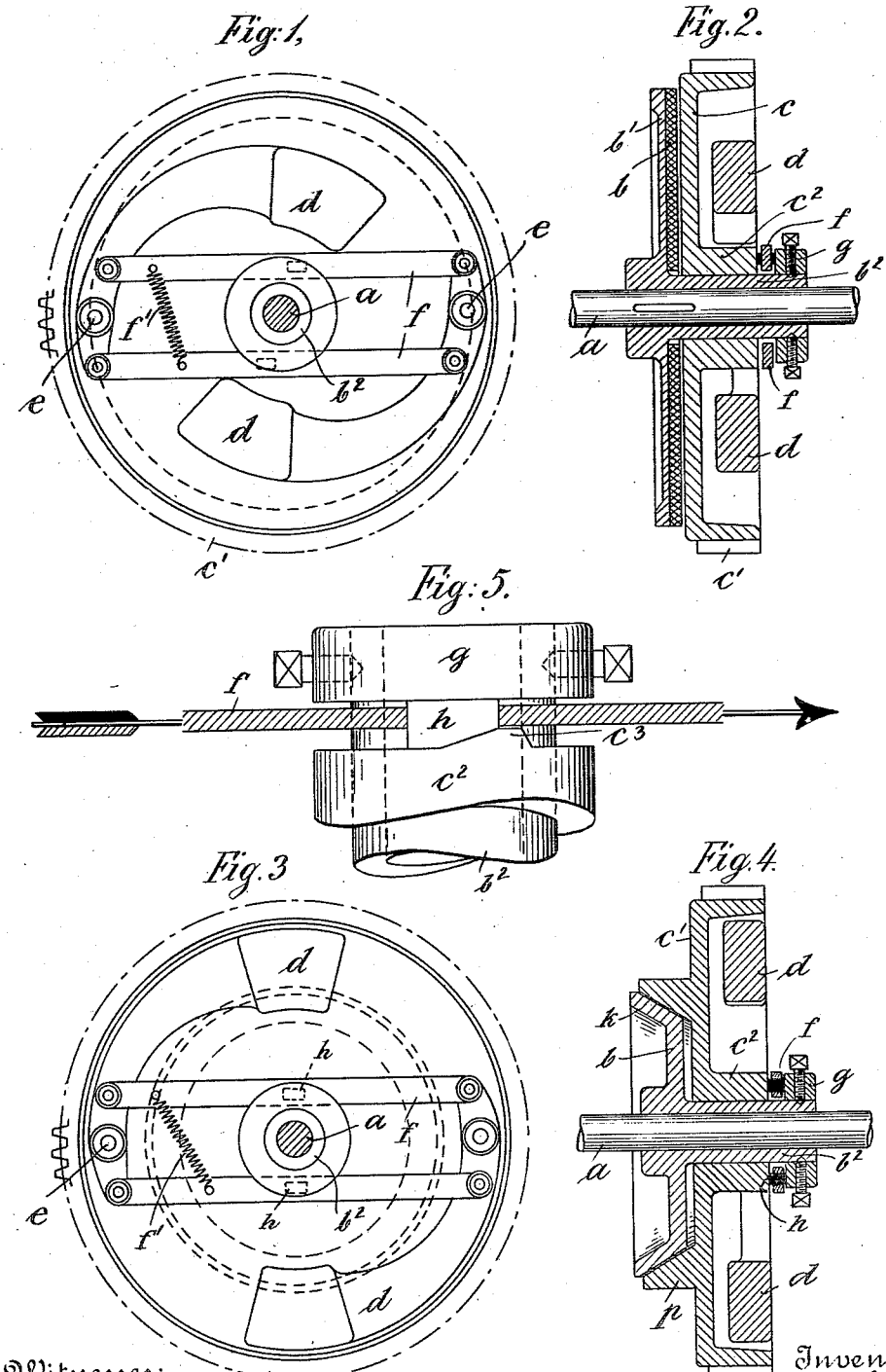
Witnesses:
Corinne Myers.
Thomas Donnellan
Inventor
Wilhelm Stuhldreier
By his Attorney

W. STUHLDREIER.
FRICTION COUPLING OPERATED BY A CENTRIFUGAL DEVICE.
APPLICATION FILED APR. 14, 1910.

979,595.

Patented Dec. 27, 1910.
2 SHEETS—SHEET 2.

Witnesses:
Thomas Donnellan.
James H. Goggin

Inventor:
Wilhelm Stuhldreier
by L. K. Böhm,
Attorney.

UNITED STATES PATENT OFFICE.

WILHELM STUHLDREIER, OF KREFELD, GERMANY.

FRICTION-COUPLING OPERATED BY A CENTRIFUGAL DEVICE.

979,595.

Specification of Letters Patent. Patented Dec. 27, 1910.

Application filed April 14, 1910. Serial No. 555,528.

*To all whom it may concern:*

Be it known that I, WILHELM STUHL-DREIER, a subject of the King of Prussia, and resident of Krefeld, in the Kingdom of Prussia, German Empire, have invented Improvements in Friction-Couplings Operated by Centrifugal Devices, of which the following is a specification.

This invention relates to friction-couplings and has for its object to provide a coupling of this character which shall be thrown into gear when the driving member has attained a predetermined speed. To this end one of the elements of the friction couplings is moved axially into frictional engagement with the other element of the coupling by weights rotating about the axis of the coupling in a plane at right angles to said axis.

In carrying this invention into effect one of the elements of the friction-coupling is moved axially by a wedging device operated by the outward movement of the weights due to centrifugal forces.

Figure 6:
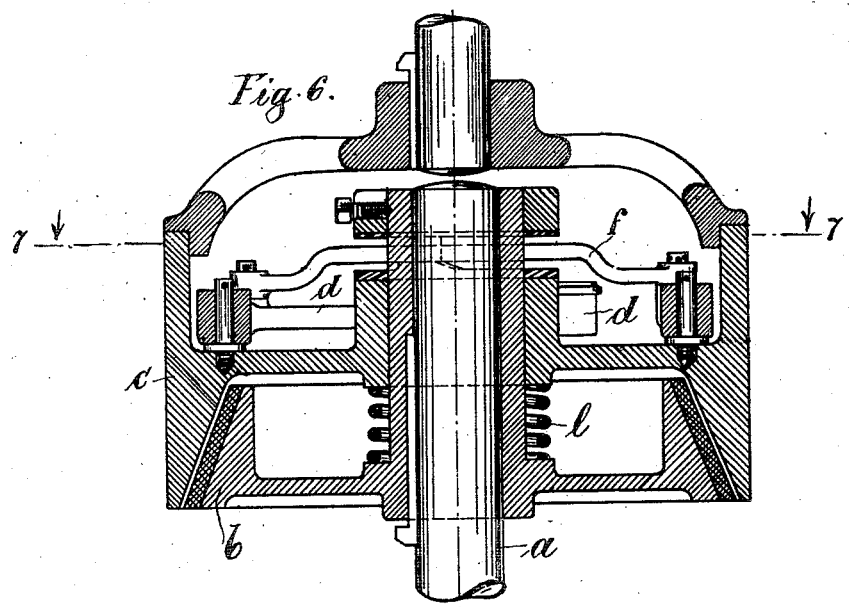
Figure 7:
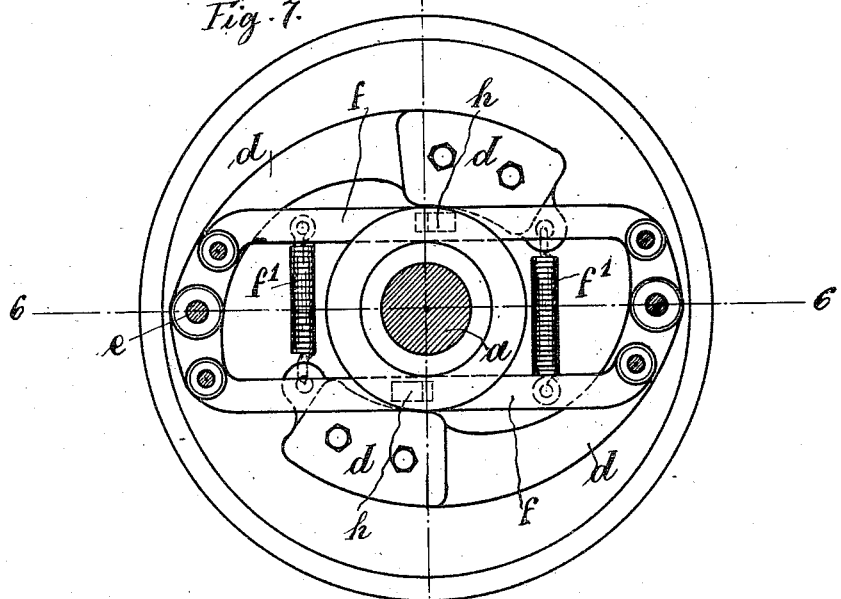

This invention is illustrated in the accompanying drawing as applied by way of examples to two constructions of coupling elements, Figures 1 and 2 being respectively an end view and longitudinal section showing the invention applied to a disk coupling, Figs. 3 and 4 being similar views showing the invention applied to a coned coupling, Fig. 5 a plan showing a detail applicable to both forms of coupling illustrated in the preceding figures, Fig. 6 is a section on line 6, 6, of Fig. 7 with spring to insure disengagement of the coupling elements below certain speed, and Fig. 7 is a section on line 7, 7 of Fig. 6.

Referring to Figs. 1, 2 and 5 upon the driven shaft $a$ is secured a coupling disk $b$ provided with a facing $b'$ of leather or the like and a sleeve $b^2$. Upon the sleeve $b^2$ rotates freely the other coupling disk $c$ also provided with a sleeve $c^2$. The disk $c$ is driven in any convenient manner for instance by teeth $c'$ gearing with a driving wheel not shown. To the disk $c$ are pivoted at $e, e$, two weighted double-armed levers $d, d$. The two arms of the levers $d$ are connected by parallel bars $f f$ pivoted at equidistant points on either side of the pivots $e$. The bars $f f$ are so formed or located as to pass between the outer face of the sleeve $c^2$ and the inner face of a collar $g$ detachably secured on the sleeve $b^2$ by set screws for example. The bars $f, f$, are drawn together by a spring $f'$ serving to restrain the outward movement of the levers $d$ when the disk $c$ is rotated and to release the coupling when the rotation of the disk ceases or the speed of rotation has fallen below a predetermined limit. Wedge pieces $h, h$, are preferably loosely inserted in slots in the bars $f, f$, and adapted to abut on the one hand against the inner face of the collar $g$ and on the other hand against corresponding coned faces provided on projections $c^3$ on the outer face of the sleeve $c^2$. When the speed of rotation of the disk $c$ has reached a predetermined limit the outward movement of the levers $d$ from the position shown in Fig. 1 toward that shown in Fig. 3 causes a longitudinal movement in opposite directions of the bars $f, f$, thus causing, through the wedges $h, h$, an axial movement of the sleeve $c^2$ and disk $c$ so as to bring the disk $c$ into frictional engagement with the disk $b$.

It is obvious that the invention is not to be restricted to the employment of wedges as other well known devices may be employed for transmitting the longitudinal movement of the bars $f, f$, so as to produce an axial movement of the disk $c$ in the desired direction.

The only difference between the construction shown in Figs. 3 and 4 and that described with reference to Figs. 1, 2 and 5 is that a conical friction coupling is employed, the coupling element $b$ being provided with a male conical flange $k$ adapted to engage with a female conical flange $p$ provided on the coupling element $c$.

The coupling is equally applicable to horizontal, vertical and oblique shafts and when necessary additional means, such as a spring, may be employed to insure complete disengagement of the two coupling elements, when the speed of rotation of the disk $c$ has fallen below the predetermined limit or when the rotation has entirely ceased. Such spring devices are shown in Figs. 6 and 7. The spring $l$ of Fig. 6 separates the coupling elements under the described conditions and the springs $f^1$ of Fig. 7 draw the two weighted double-armed levers $d, d$, pivoted to the coupling disk $c$, together under like conditions.

I claim:

1. In a friction coupling the combination with the driven shaft and a coupling element keyed on said shaft, of a second coupling element capable of rotating freely around said shaft and of being moved axially into frictional engagement with the first named element, a centrifugal device, comprising two weighted double-armed levers, a pivot for each of said levers arranged diametrically opposite on either side of the axis or prolongation of the axis of said shaft, two parallel members, each connecting an arm of one lever with the other arm of the other lever, pivots for connecting said members to said arms arranged at equidistant points on either side of the pivots of said levers, a resistance device for opposing the upward movement of said weighted lever and means for utilizing the longitudinal movement of said members caused by the outward movement of said levers and the first named element as an abutment for causing an axial movement of the second named element into frictional engagement with the first named element.

2. In a friction coupling the combination with the shaft to be driven of a coupling element secured on said shaft, a concentric sleeve on said element, a second coupling element provided with a sleeve and being capable of rotating freely on the first named sleeve and of being moved into frictional engagement with the first named element, a collar on the first named sleeve located so as to provide an annular slot beween the inner face of said collar and the outer face of the sleeve on said second element, means for detachably securing said collar to the first named sleeve, two weighted double-armed levers pivoted at two diametrically opposite points to said second element, two parallel members pivoted to each lever at equidistant points on either side of said pivots, each connecting opposite arms of said levers and adapted to reciprocate in said annular slot, a slot in each of said parallel members, a wedge located in each of said slots, corresponding cone surfaces on the outer face of the sleeve on said second element adapted to coöperate with said wedges and a spring device adapted to hold said levers in the inward position and to restrain the outward movement of said levers.

3. In a friction coupling the combination with the shaft to be driven of a coupling element secured to said shaft, a concentric sleeve on said element, a second coupling element provided with a sleeve and being capable of rotating freely on the first named sleeve and of being moved into frictional engagement with the first named element, a collar on the first named sleeve located so as to provide an annular slot between the inner face of said collar and the outer face of the sleeve on said second element, means for detachably securing said collar to the first named sleeve, two weighted double-armed levers pivoted at two diametrically opposite points to said second element, two parallel members pivoted to each lever at equidistant points on either side of said pivots, each connecting opposite arms of said levers and adapted to reciprocate in said annular slot, a slot in each of said parallel members, a wedge located in each of said slots, corresponding cone surfaces on the outer face of the sleeve on said second element adapted to coöperate with said wedges, a spring device adapted to hold said levers in the inward position and to restrain the outward movement of said levers and means for returning said second element into normal position.

In witness whereof I have hereunto set my hand in the presence of two witnesses.

WILHELM STUHLDREIER.

Witnesses:
  HENRY QUADFLIEG,
  W. J. REUTERS.